Figure 1:
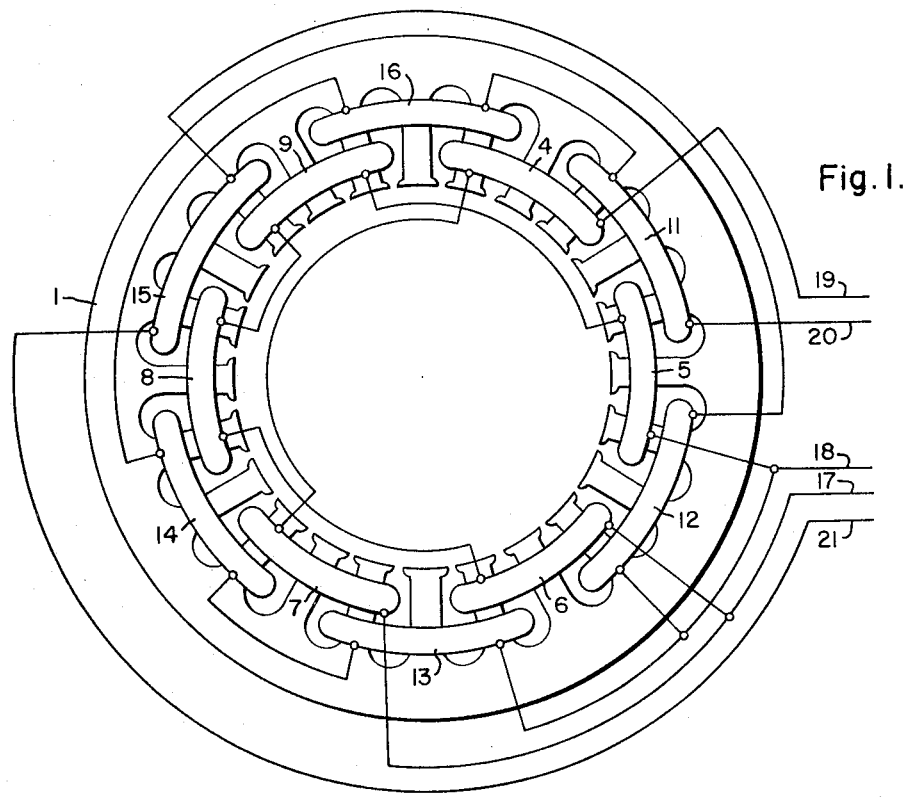

Dec. 27, 1966  G. E. HERZOG  3,295,034
TWO-SPEED SINGLE-PHASE ELECTRIC MOTOR
Filed Aug. 26, 1963

WITNESSES:
Bernard R. Gieguez
James H. Young

INVENTOR
George E. Herzog
BY F. F. Lyle
ATTORNEY

United States Patent Office 3,295,034
Patented Dec. 27, 1966

3,295,034
TWO-SPEED SINGLE-PHASE ELECTRIC MOTOR
George E. Herzog, Shawnee Township, Ohio, assignor to Westinghouse Electric Corporation, Pittsburgh, Pa., a corporation of Pennsylvania
Filed Aug. 26, 1963, Ser. No. 304,313
4 Claims. (Cl. 318—224)

The present invention relates to two-speed single-phase induction motors, and more particularly to an improved two-speed motor of the pole changing type.

Single-phase induction motors of the type to which the invention relates have a main primary winding and an auxiliary primary winding which are displaced from each other by ninety electrical degrees on the primary member or stator of the motor and which carry currents displaced in phase in order to produce torque.

It is often necessary to provide for operation of these motors at either one of two different speeds, and this may be done by changing the number of poles of the primary winding. One way in which this is commonly done is to provide two main windings of different pole numbers and an auxiliary winding having the same number of poles as one of the main windings. The motor is then started using the auxiliary winding and the corresponding main winding, and if operation at the other speed is desired the motor is switched to the other main winding after starting. This arrangement is suitable for motors of the split-phase or capacitor-start types, in which the auxiliary winding is disconnected after the motor has started, but is not suitable for motors of the permanent split capacitor type in which the auxiliary winding and capacitor remain connected to the line during operation. In these motors, two-speed operation has been obtained by using two main windings of different pole members and two corresponding auxiliary windings. This requires inserting four separate windings in the slots of the stator, which is undesirable because of the difficulty and cost of inserting the windings and the increase in size of the motor which is usually necessary to provide space in the slots for four windings. This arrangement also has the disadvantage that approximately half of the total winding material in the motor is inactive in either mode of operation, which is undesirable and inefficient.

The principal object of the present invention is to provide a two-speed single-phase motor of the pole changing type which requires only one main winding and one auxiliary winding.

Another object of the invention is to provide a two-speed single-phase motor having only one main winding and one auxiliary winding which can be wound on the usual winding machines, and which will start and run on either speed.

A more specific object of the invention is to provide a single-phase motor of the permanent split capacitor type which will run as either a six-pole or a ten-pole motor, and which will start and run on either speed so that simple external switching means can be used to select the desired speed.

Figure 2:
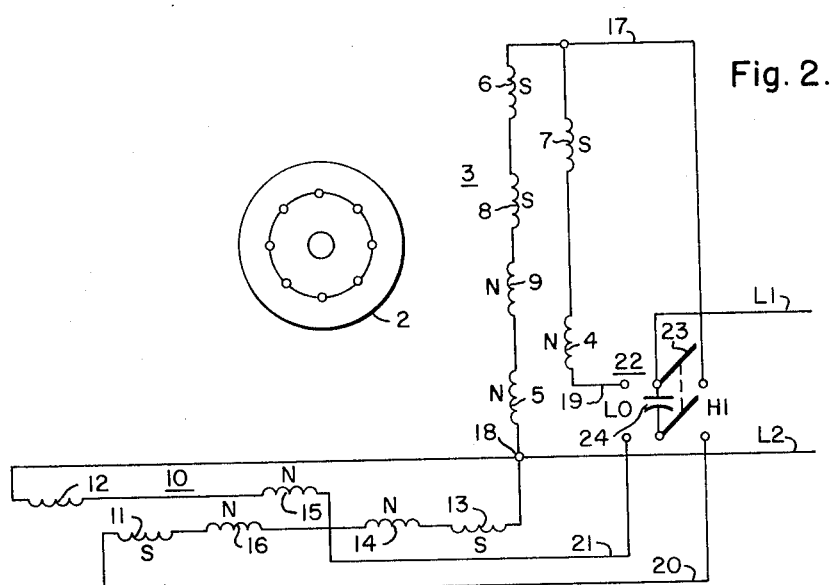

Other objects and advantages of the invention will be apparent from the following detailed description, taken in connection with the accompanying drawings, in which:

FIGURE 1 is a somewhat diagrammatic view of the stator member of a motor embodying the invention, showing the arrangement of the windings; and FIG. 2 is a wiring diagram showing the connections of the motor windings.

The invention is shown in the drawings embodied in a single-phase induction motor of the permanent split capacitor type intended for operation on either six poles or ten poles. As shown in FIGURE 1, the motor has a stator or primary member consisting of a laminated core 1 of usual construction with the primary windings wound in slots in the core in the usual manner. The motor has a rotor or secondary member, shown diagrammatically in FIG. 2 as a squirrel cage rotor 2. The motor may be of any usual or desired physical construction.

The motor has a main primary winding 3 consisting of six pole groups or coils 4, 5, 6, 7, 8 and 9, which are wound in the slots of the stator core 1 as shown in FIGURE 1. The pole groups have been shown in the drawing as single coils but it will be understood that they may each consist of a plurality of coils arranged and connected to each other in any usual or desired manner.

An auxiliary winding 10 is provided which also has six pole groups 11, 12, 13, 14, 15 and 16. These pole groups may be similar to those of the main winding, and they are wound in the slots of the stator core 1 as shown in FIGURE 1. The auxiliary winding is displaced ninety electrical degrees from the main winding in the usual manner. It will be seen that the physical arrangement of the main and auxiliary windings is essentially similar to that of a conventional single-speed six pole motor, so that the windings can readily be wound in the core by usual or conventional winding machines at low cost.

In accordance with the invention, the windings are arranged and connected in the manner shown in the drawings, so that each winding consists of three adjacent pole groups of one polarity and three adjacent pole groups of opposite polarity, as indicated by the instantaneous polarities shown in FIG. 2. Thus, the main winding is connected so that the pole groups 4, 5 and 9, which are adjacent to each other, are of the same polarity, and pole groups 6, 7 and 8, which are adjacent to each other, are all of the opposite polarity. The auxiliary winding is similarly arranged with its adjacent pole groups 11, 12 and 13 of one polarity, and pole groups 14, 15 and 16 of the opposite polarity.

It will be seen that each winding has two pairs of adjacent pole groups of opposite polarity separated by single intervening pole groups which are of opposite polarity with respect to each other. Thus, the main winding 3 has a pair of adjacent pole groups 5 and 6 of opposite polarity and a pair of adjacent pole groups 8 and 9 of opposite polarity, with these two pairs of pole groups separated by intervening single pole groups 4 and 7 of opposite polarity with respect to each other. Similarly, the auxiliary winding 10 has two pairs of adjacent pole groups of opposite polarities 11 and 16, and 13 and 14, which are separated by intervening single pole groups 12 and 15 of opposite polarity with respect to each other.

Each winding is connected in two portions. Thus, the main winding 3 has one portion consisting of the two pairs of adjacent opposite polarity pole groups 5, 6 and 8, 9 which are connected together in series and to an external lead 17, the other end of this winding portion being connected to a common terminal 18. The two intervening pole groups 4 and 7 are connected together as shown in a second winding portion which is connected to the lead 17 and to an external lead 19.

The auxiliary winding 10 is similarly connected in two portions. The two pairs of adjacent pole groups of opposite polarity 13, 14 and 11, 16 are connected together as shown in one portion of the winding between the common terminal 18 and an external lead 20. The two intervening pole groups 12 and 15 are connected together in a second portion of the winding between the common terminal 18 and an external lead 21.

As previously indicated, this arrangement of the motor windings makes it possible to start and run on either of two speeds and to connect the motor for either speed by very simple external switching means. For this purpose, a simple double pole, double throw switch 22 is shown in the drawing for connecting the motor to a single-phase line L1, L2. The common terminal 18 is connected directly to one side of the line, and the other side of the line is connected to the motor windings by means of the switch 22 which has an off position so that it may also function as a line switch. As shown in FIG. 2, the leads 17 and 20 are connected to the two terminals at one side of the switch for high-speed operation, while the leads 19 and 21 are connected to the two terminals at the other side of the switch for low-speed operation. The line is connected to the two-pole contact member 23 of the switch and the two poles of the contact member are connected together through a capacitor 24.

In the operation of this motor, if high-speed operation is desired, the switch 22 is closed on the right-hand or high speed terminals. It will be seen from FIG. 2 that the first portion of the main winding 3 consisting of the pole groups 5, 6, 8 and 9 is then connected to the line, and that the corresponding portion of the auxiliary winding 10 consisting of pole groups 11, 13, 14, and 16 is connected to the line in series with the capacitor 24. Thus four pole groups of each winding are energized with instantaneous polarities as indicated in FIG. 2. Starting from the common connection 18, the main winding 3 has an energized north pole, an unenergized pole group, a north pole, a south pole, an unenergized pole group, and a south pole. Consequent poles of proper polarity appear in the spaces occupied by the unenergized pole groups, and a six pole field is thus produced. The auxiliary winding 10 is similarly energized with a similar sequence of polarities so that it also produces a six pole field displaced from that of the main winding 3. The motor will thus start and run as a six pole motor at the desired high speed.

For low speed operation, the switch 22 is closed on the low speed or left-hand contacts in FIG. 2. In this connection, it will be seen that both portions of the main winding 3 are connected in series between the common terminal 18 and the line so that all pole groups are energized. In this connection there are three consecutive north poles followed by three consecutive south poles. Consequent poles of opposite polarity appear between adjacent pole groups of like polarity, with the result that a ten pole field is produced. The second section only of the auxiliary winding 10, consisting of the pole groups 12 and 15, is connected between the common terminal 18 and the line in series with the capacitor 24. Thus two physically opposite pole groups of opposite polarities are energized in the auxiliary winding. The relative reluctances in the magnetic circuit of the motor are such that, in effect, four consequent poles of alternating polarities appear on each side between the pole groups 12 and 15, resulting in a ten pole auxiliary winding field. The motor will thus start and run as a ten pole motor at the desired low speed.

It will now be apparent that a two-speed motor has been provided which requires only one main winding and one auxiliary winding, so that it can readily be wound on standard winding machines at low cost, and the winding material is fully utilized on both operating speeds. The motor will start and run on either speed so that a simple external switch, such as the two pole, double throw switch shown, can be utilized for selecting the desired speed of operation. The winding arrangement is particularly suitable for motors of the permanent split capacitor type which requires no starting switch, and the external speed selector switch can be utilized in the manner shown for connecting the capacitor to the auxiliary winding for operation at either speed. It will be apparent, however, that the invention is not necessarily restricted to motors of this particular type but can be applied to single-phase motors of other types, with appropriate changes in the switching arrangement and with a speed-responsive switch to disconnect the auxiliary winding if necessary. It will also be understood that although a particular combination of pole numbers has been shown for the purpose of illustration, the invention may also be applied to motors having other numbers of poles if desired.

A particular embodiment of the invention has been shown and described for the purpose of illustration, but it will be apparent that other embodiments are possible, and the invention is not limited to the specific details shown or to the specific switching arrangement described but in its broadest aspects it includes all equivalent embodiments and modifications.

I claim as my invention:

1. A two-speed single-phase motor having a main primary winding and an auxiliary primary winding, said windings having the same number of pole groups and being displaced from each other on the primary member of the motor, each of said windings comprising a first portion consisting of at least two pairs of adjacent pole groups, the pole groups of each pair being of opposite polarity, and said pairs of pole groups being separated by intervening pole groups and a second portion consisting of said intervening pole groups, the intervening pole groups being of successively opposite polarities and each intervening pole group being of the same polarity as the adjacent pole groups of the first portion, and means for alternatively connecting the first portions only of both windings to a single-phase line for operation of the motor at one speed or for connecting the first and second portions of the main winding and the second portion only of the auxiliary winding to the line for operation at a different speed.

2. A two-speed single-phase motor having a main primary winding and an auxiliary primary winding, said windings having the same number of pole groups and being displaced from each other on the primary member of the motor, each of said windings comprising a first portion consisting of at least two pairs of adjacent pole groups, the pole groups of each pair being of opposite polarity, and said pairs of pole groups being separated by intervening pole groups and a second portion consisting of said intervening pole groups, the intervening pole groups being of successively opposite polarities and each intervening pole group being of the same polarity as the adjacent pole groups of the first portion, and switching means for connecting said windings to a single-phase line, said switching means having a first position for connecting a capacitor in series with the first portion of the auxiliary winding and for connecting the first portions only of both windings to the line, and the switching means having a second position for connecting the capacitor in series with the second portion of the auxiliary winding and for connecting the first and second portions of the main winding and the second portion only of the auxiliary winding to the line.

3. A two-speed single-phase motor having a main primary winding and an auxiliary primary winding, said windings having the same number of pole groups and being displaced from each other on the primary member of the motor, each of said windings having six pole groups, three adjacent pole groups being of one polarity and three adjacent pole groups being of opposite polarity, whereby there are two pairs of adjacent pole groups of different polarity separated by intervening pole groups of opposite polarity to each other, means for connecting said two pairs of pole groups of each winding in a first portion of the winding and for connecting said intervening pole groups of each winding in a second portion of the winding, and means for alternatively connecting the first portions only of both windings to a single-phase line for operation of the motor at one speed or for connecting the first and second portions of the main winding and the second portion only of the auxiliary winding to the line for operation at a different speed.

4. A two-speed single-phase motor having a main primary winding and an auxiliary primary winding, said windings having the same number of pole groups and being displaced from each other on the primary member of the motor, each of said windings having six pole groups, three adjacent pole groups being of one polarity and three adjacent pole groups being of opposite polarity, whereby there are two pairs of adjacent pole groups of different polarity separated by intervening pole groups of opposite polarity to each other, means for connecting said two pairs of pole groups of each winding in a first portion of the winding and for connecting said intervening pole groups of each winding in a second portion of the winding, and switching means for connecting said windings to a single-phase line, said switching means having a first position for connecting a capacitor in series with the first portion of the auxiliary winding and for connecting the first portions only of both windings to the line, and the switching means having a second position for connecting the capacitor in series with the second portion of the auxiliary winding and for connecting the first and second portions of the main winding and the second portion only of the auxiliary winding to the line.

References Cited by the Examiner

UNITED STATES PATENTS

| | | | |
|---|---|---|---|
| 1,966,212 | 7/1934 | Morrill | 318—220 |
| 2,033,525 | 3/1936 | Kennedy | 318—224 |
| 2,409,891 | 10/1946 | Packer | 318—224 |
| 2,671,879 | 3/1954 | Schwarz | 318—220 |
| 2,941,138 | 6/1960 | Ramer | 318—221 X |

ORIS L. RADER, *Primary Examiner.*

G. Z. RUBINSON, *Assistant Examiner.*